(12) United States Patent
Lee et al.

(10) Patent No.: US 9,655,131 B2
(45) Date of Patent: May 16, 2017

(54) METHOD AND APPARATUS FOR TRANSMITTING INDICATION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/417,328

(22) PCT Filed: Aug. 1, 2013

(86) PCT No.: PCT/KR2013/006926
§ 371 (c)(1),
(2) Date: Jan. 26, 2015

(87) PCT Pub. No.: WO2014/021650
PCT Pub. Date: Feb. 6, 2014

(65) Prior Publication Data
US 2015/0181610 A1    Jun. 25, 2015

Related U.S. Application Data

(60) Provisional application No. 61/679,091, filed on Aug. 3, 2012.

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0062* (2013.01); *H04L 5/0091* (2013.01); *H04W 28/0236* (2013.01); *H04W 72/00* (2013.01)

(58) Field of Classification Search
CPC ... H04L 5/0062; H04L 5/0091; H04L 5/0073; H04L 25/08; H04W 72/00;
(Continued)

(56) References Cited

U.S. PATENT DOCUMENTS

2010/0067469 A1*   3/2010   Gaal ................... H04W 72/082
                                                        370/329
2012/0020231 A1    1/2012   Chen et al.
(Continued)

FOREIGN PATENT DOCUMENTS

| CN | 102316468 | 1/2012 |
|---|---|---|
| CN | 102474786 | 5/2012 |
| WO | 2012/053800 | 4/2012 |

OTHER PUBLICATIONS

LG Electronics Inc., "FDM procedure for avoiding IDC interference," 3GPP TSG-RAN2 Meeting #75bis, R2-115426, Oct. 2011, 4 pages.
(Continued)

*Primary Examiner* — Warner Wong
(74) *Attorney, Agent, or Firm* — Lee Hong Degerman Kang & Waimey

(57) ABSTRACT

A method and apparatus for transmitting an indication in a wireless communication is provided. A user equipment (UE) transmits a multimedia broadcast/multicast service (MBMS) interest indication indicating a long-term evolution (LTE) frequency, and if an in-device coexistence (IDC) interference is detected on the LTE frequency, the UE transmits updated MBMS interest indication excluding the LTE frequency.

6 Claims, 12 Drawing Sheets

(51) Int. Cl.
*H04W 28/02* (2009.01)
*H04W 72/00* (2009.01)

(58) Field of Classification Search
CPC .......... H04W 72/082; H04W 28/0236; H04W 36/20; H04W 28/00; H04W 72/08; H04W 76/00; H04W 76/02; H04B 1/10
See application file for complete search history.

(56) References Cited

U.S. PATENT DOCUMENTS

| | | | |
|---|---|---|---|
| 2012/0026929 A1* | 2/2012 | Wang | H04W 72/005 370/312 |
| 2012/0040676 A1 | 2/2012 | Jang et al. | |
| 2012/0082140 A1* | 4/2012 | Lin | H04W 72/1215 370/336 |
| 2012/0275369 A1* | 11/2012 | Zhang | H04W 76/002 370/312 |
| 2013/0064162 A1* | 3/2013 | Phan | H04W 72/005 370/312 |
| 2014/0036676 A1* | 2/2014 | Purnadi | H04W 36/0055 370/235 |
| 2014/0086173 A1* | 3/2014 | Sadeghi | H04L 5/005 370/329 |
| 2014/0341059 A1* | 11/2014 | Jang | H04W 48/06 370/252 |
| 2015/0124682 A1* | 5/2015 | Phan | H04W 4/06 370/312 |
| 2015/0131613 A1* | 5/2015 | Jung | H04W 24/10 370/331 |
| 2016/0014571 A1* | 1/2016 | Lee | H04W 72/005 370/312 |
| 2016/0080996 A1* | 3/2016 | Fukuta | H04W 56/00 370/311 |

OTHER PUBLICATIONS

Samsung, "TP on Introducing common procedure for UE status indication," 3GPP TSG-RAN WG2 Meeting #78, R2-122631, May 2012, 11 pages.
PCT International Application No. PCT/KR2013/006926, Written Opinion of the International Searching Authority dated Nov. 20, 2013, 1 page.
MediaTek, "Measurement Handling for IDC Support," 3GPP TSG RAN WG2 #78, R2-122279, XP50606906, May 2012, 4 pages.
Samsung, "Introducing MBMS Enhancements," 3GPP TSG-RAN WG2 #78, R2-122631, XP50607128, May 2012, 16 pages.
European Patent Office Application Serial No. 13825084.0, Search Report dated Apr. 7, 2016, 7 pages.
State Intellectual Property Office of the People's Republic of China Application No. 201380041311.6, Office Action dated Dec. 26, 2016, 8 pages.

* cited by examiner

METHOD AND APPARATUS FOR TRANSMITTING INDICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/006926, filed on Aug. 1, 2013, which claims the benefit of U.S. Provisional Application Ser. No. 61/679,091, filed on Aug. 3, 2012, the contents of which are all hereby incorporated by reference herein in their entirety.

BACKGROUND OF THE INVENTION

Field of the Invention

The present invention relates to wireless communications, and more particularly, to a method and apparatus for transmitting an indication in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE provides a multimedia broadcast/multicast service (MBMS). The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

In order to allow users to access various networks and services ubiquitously, an increasing number of user equipments (UEs) are equipped with multiple radio transceivers. For example, a UE may be equipped with LTE, Wi-Fi, Bluetooth (BT) transceivers, etc, for a wireless communication system, and global navigation satellite system (GNSS) receivers. For example, a UE may be equipped with a LTE module and a Bluetooth module in order to receive a voice over Internet (VoIP) service, multimedia service using a Bluetooth earphone. A UE may be equipped with a LTE module and a Wi-Fi module in order to distribute traffics. A UE may be equipped with a LTE module and a GNSS module in order to acquire location information additionally.

Due to extreme proximity of multiple radio transceivers within the same UE, the transmit power of one transmitter may be much higher than the received power level of another receiver. By means of filter technologies and sufficient frequency separation, the transmit signal may not result in significant interference. But for some coexistence scenarios, e.g. different radio technologies within the same UE operating on adjacent frequencies or sub-harmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios. Therefore, solving the interference problem by single generic radio frequency (RF) design may not always be possible and alternative methods needs to be considered.

When the UE needs to receive a LTE common channel for a public warning system (PWS) message or an MBMS and transmit industrial, scientific and medical (ISM) radio, the UE may need to select one of either reception of the LTE common channel or transmission of the ISM radio. Accordingly, when the IDC interference is detected, a method for transmitting an indication for prioritizing one of either reception of the LTE common channel or transmission of the ISM radio may be required.

SUMMARY OF THE INVENTION

The present invention provides a method for transmitting an indication in a wireless communication system. The present invention provides a method for transmitting an indication for reception of a public warning system (PWS) message or a multimedia broadcast/multicast service (MBMS). The present invention provides a method for transmitting an indication for transmission of industrial, scientific and medical (ISM) radio.

In an aspect, a method for transmitting, by a user equipment (UE), an indication in a wireless communication is provided. The method includes transmitting a first indication indicating a frequency, detecting interference on the frequency, and transmitting a second indication not including the frequency.

The first indication and the second indication may correspond to a specific service.

The first indication and the second indication may correspond to a multimedia broadcast/multicast service (MBMS) interest indication.

The frequency may be a long-term evolution (LTE) frequency.

The frequency may be a frequency where an interested specific service is received.

The interference may be in-device coexistence (IDC) interference.

The method may further include transmitting an interference indication indicating that the frequency is unusable due to the interference.

The interference indication may be an IDC indication.

In another aspect, a method for transmitting, by a user equipment (UE), an indication in a wireless communication is provided. The method includes receiving a message or a service on a frequency, detecting interference on the frequency, and transmitting an indication indicating that the message or the service undergo the interference on the frequency.

The message may be a public warning system (PWS) message.

The service may be a multimedia broadcast/multicast service (MBMS).

The interference may be in-device coexistence (IDC) interference.

The indication may be an in-device coexistence (IDC) indication.

The IDC indication may include time division multiplexing (TDM) assistance information.

A PWS message and/or an MBMS can be received stably.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
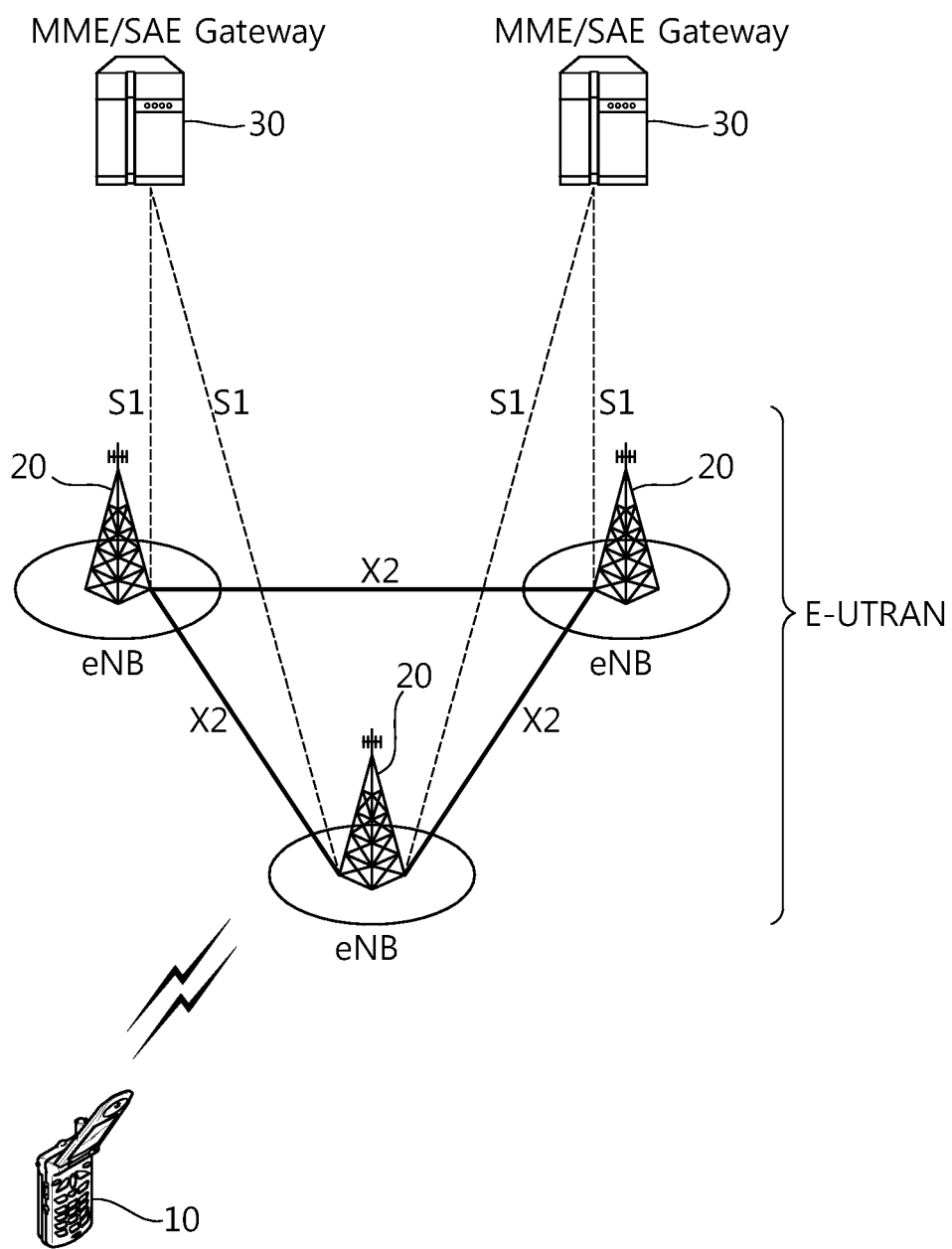
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
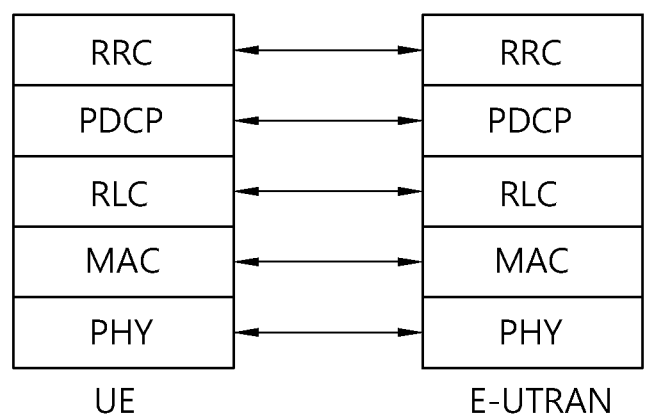
FIG. 2 is a diagram showing radio interface protocol architecture for a control plane.
Figure 3:
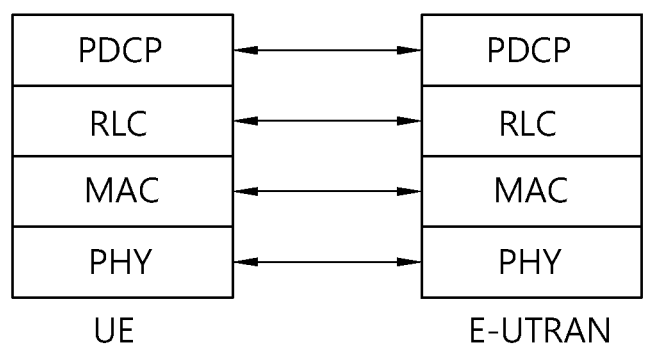
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
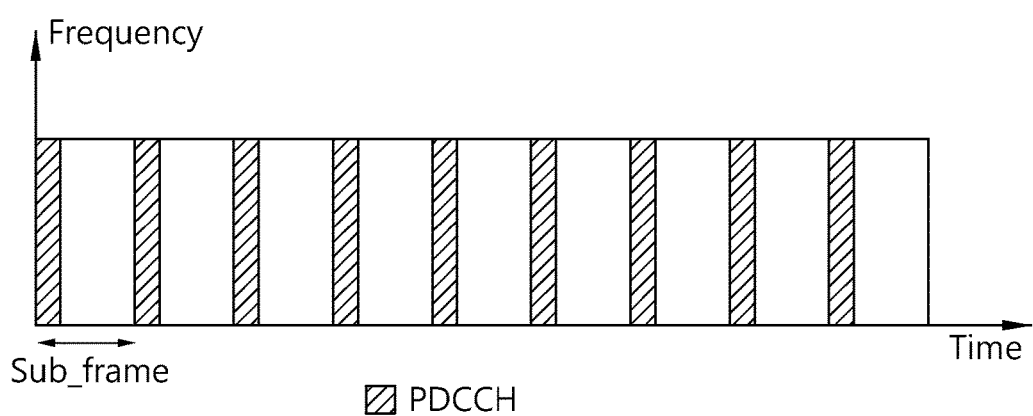
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An MBMS is described in detail. For MBMS, the following definitions may be introduced. It may be referred to Section 15 of 3GPP TS 36.300 V12.2.0 (2012-06).

Multicast broadcast single frequency network (MBSFN) synchronization area: an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas MBSFN transmission or a transmission in MBSFN mode: a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e. when it knows which MBSFN area applies for the service(s) it is interested to receive.

MBSFN area reserved cell: A cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast/multicast service center (BM-SC) and the MBMS coordination entity (MCE).

Synchronization Period: The synchronization period provides the time reference for the indication of the start time of each synchronization sequence. The time stamp which is provided in each SYNC PDU is a relative value which refers to the start time of the synchronization period. The duration of the synchronization period is configurable.

Figure 5:
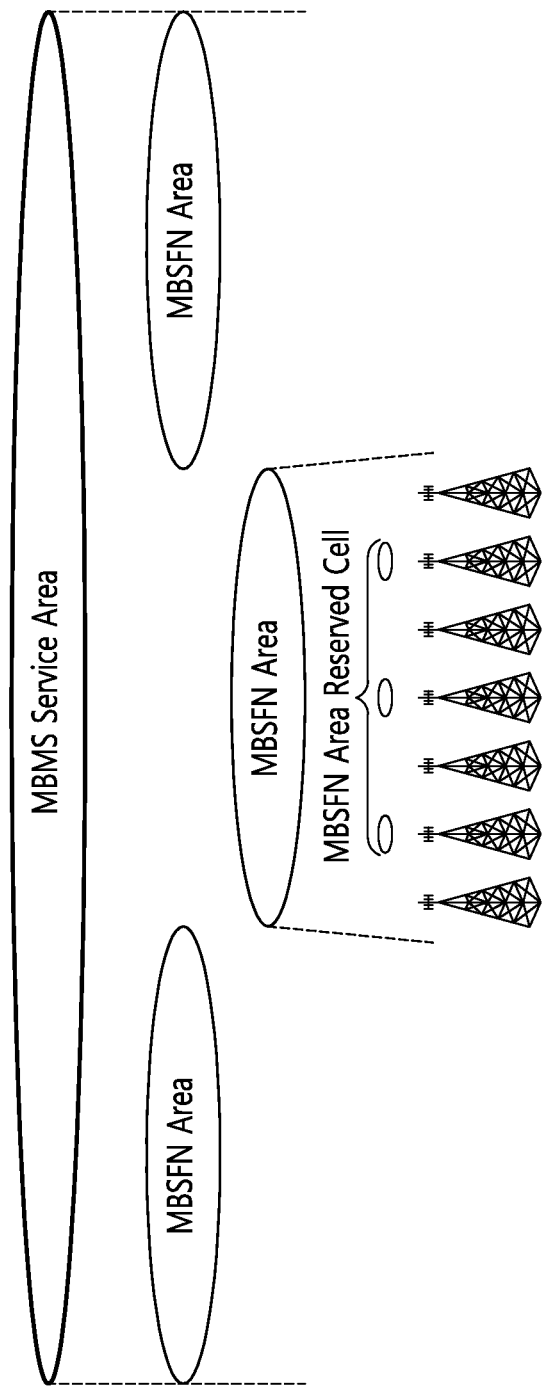
FIG. 5 shows definitions of MBMS.

FIG. 5 shows definitions of MBMS.

Referring to FIG. 5, an MBMS service area may consists of one or more MBSFN area. In each MBSFN area, a plurality of cells, including a plurality of MBSFN area reserved cells, may exist.

As a transport channel for an MBMS, an MCH can be mapped to an MCCH which is a logical channel for a control signal and an MTCH which is a logical channel for data. The MCCH can transmit an MBMS-related RRC message. The MTCH can transmit traffic of a specific MBMS. A single MCCH channel may exist for every single multicast-broadcast single frequency network (MBSFN) for transmitting MBMS information and traffic. Alternatively, when a plurality of MBSFN areas are provided in a single cell, the UE may receive a plurality of MCCHs. When the MBMS-related RRC message is changed in a specific MCCH, the PDCCH can transmit an MBMS radio network temporary identity (M-RNTI) and an MCCH indicator indicating a specific MCCH. By receiving the M-RNTI and the MCCH indicator through the PDCCH, the UE supporting the MBMS can determine that the MBMS-related RRC message is changed in the specific MCCH and can receive the specific MCCH. An RRC message of the MCCH can be changed in every modification period, and can be repetitively broadcast in every repetition period.

While the UE receives the MBMS, the UE may receive a dedicated service. For example, some users may watch TV through the MBMS using smart phones at the same time while making a use of an instant messaging (IM) service using the smart phones. In this case, the MBMS may be provided on the MTCH received by multiple UEs. A service provided to each UE respectively, such as the IM service, may be provided on a dedicated bearer such as the DCCH or a dedicated traffic channel (DTCH).

In an area, a specific BS may use multiple frequencies at the same time. For using radio resources efficiently, the network may provide the MBMS on only one frequency among the multiple frequencies, and may provide dedicated bearers to each UE on all multiple frequencies. In this case, if the UE, which receives a service using the dedicated bearer in a frequency not providing the MBMS, wants to receive the MBMS, the UE may have to be handed over to a frequency providing the MBMS.

For this, a network control option may be adopted as a basic architecture for handling the MBMS. The network may be informed about UE's interest in the MBMS by the UE, and then the network tries to ensure that the UE is able to receive the MBMS. That is, if the UE would like to receive the MBMS, the UE transmits an MBMS interest indication to the BS. The MBMS interest indication provides MBMS interest information at the level of a frequency rather than of an individual service, and indicates UE's interest in MBMS frequency reception. Upon receiving the MBMS interest indication from the UE, the BS acknowledges that the UE wants to receive the MBMS, and makes the UE move to a frequency providing the MBMS. The MBMS interest indication may indicate that the UE wants to receive the MBMS. The MBMS interest indication may include information on the frequency which provides the MBMS that the UE wants to receive. The UE may obtain the information on the frequency providing the MBMS that the UE wants to receive, by receiving a system information block (SIB)-15 from a serving cell. The UE may transmit the MBMS interest indication whenever the UE's interest changes.

MBMS continuity is described. The UE who wants to receive a specific MBMS acknowledges information on frequency and time on which the specific MBMS is provided. When the MBMS is on air or is going to be broadcast soon, the UE sets a priority of a frequency providing the MBMS to the highest priority. The UE in the RRC_IDLE can move to a cell providing the MBMS and receive the MBMS by performing a cell reselection procedure using the frequency priority information which is set.

Figure 6:
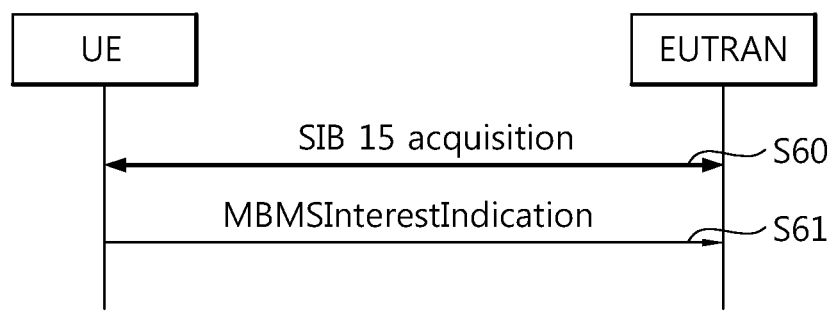
FIG. 6 shows an MBMS interest indication procedure.

FIG. 6 shows an MBMS interest indication procedure. The purpose of this procedure is to inform the E-UTRAN that the UE is receiving or is interested to receive MBMS via an MRB, and if so, to inform the E-UTRAN about the priority of MBMS versus unicast reception.

Referring to FIG. 6, at step S60, the UE acquires a system information block 15 (SIB15) from the E-UTRAN. At step S61, the UE transmits an MBMS interest indication (MBMSInterestIndication) message to the E-UTRAN.

In-device coexistence (IDC) is described below. It may be referred to Section 23.4 of 3GPP TS 36.300 V11.2.0 (2012-06).

Figure 7:
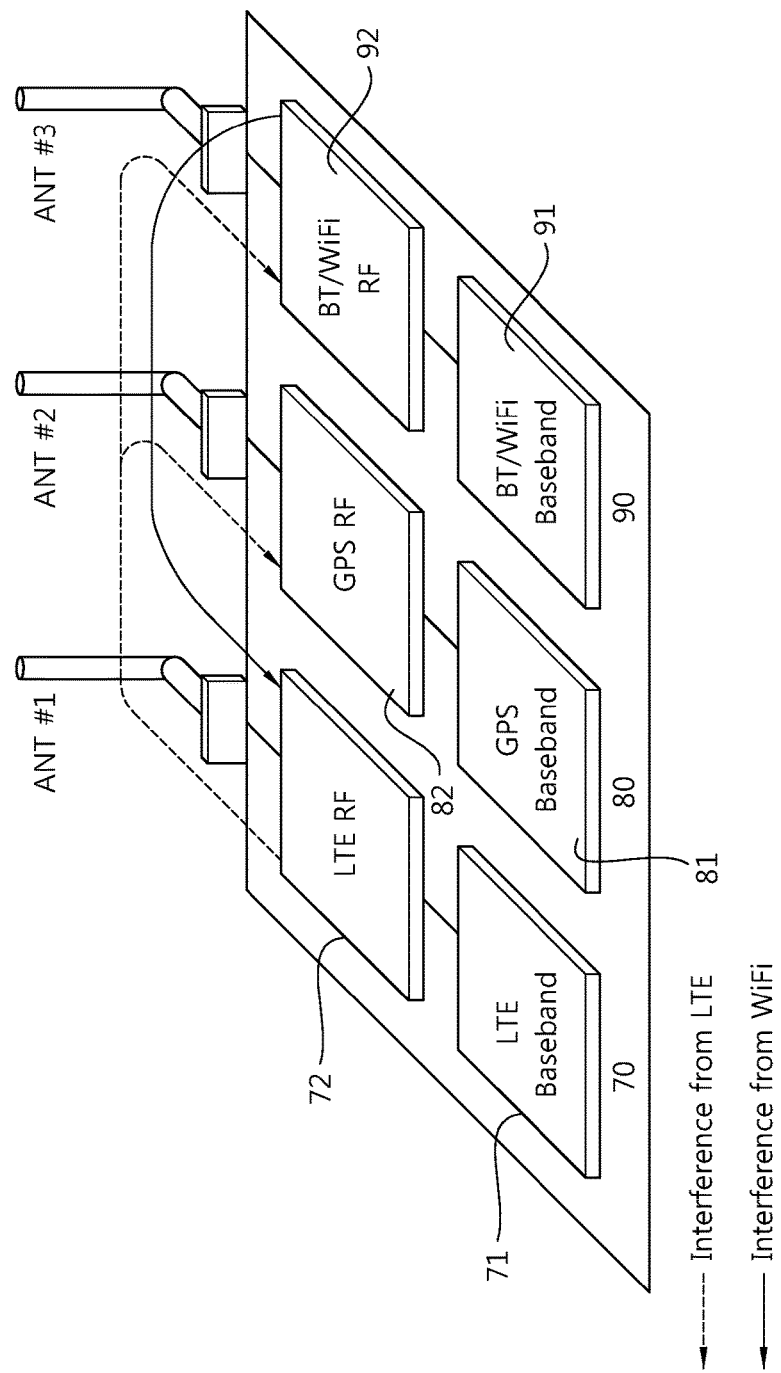
FIG. 7 shows an example of IDC interference within a UE.

FIG. 7 shows an example of IDC interference within a UE.

A LTE module 70 includes a LTE baseband 71 and a LTE RF 72. A global positioning system (GPS) module 80 includes a GPS baseband 81 and a GPS RF 82. A Bluetooth (BT)/Wi-Fi module 90 includes a BT/Wi-Fi baseband 91 and a BT/Wi-Fi RF 92. For example, if all of the LTE module 70, the GPS module 80 and the BT/Wi-Fi module 90 are switched on, the LTE module 70 may interfere the GPS module 80 and the BT/Wi-Fi module 90. Or the BT/Wi-Fi module 90 may interfere the LTE module 70.

Coexistence interference scenarios between LTE radio and other radio technologies are described. 3GPP frequency bands around 2.4 GHz industrial, scientific and medical (ISM) bands are considered.

Figure 8:
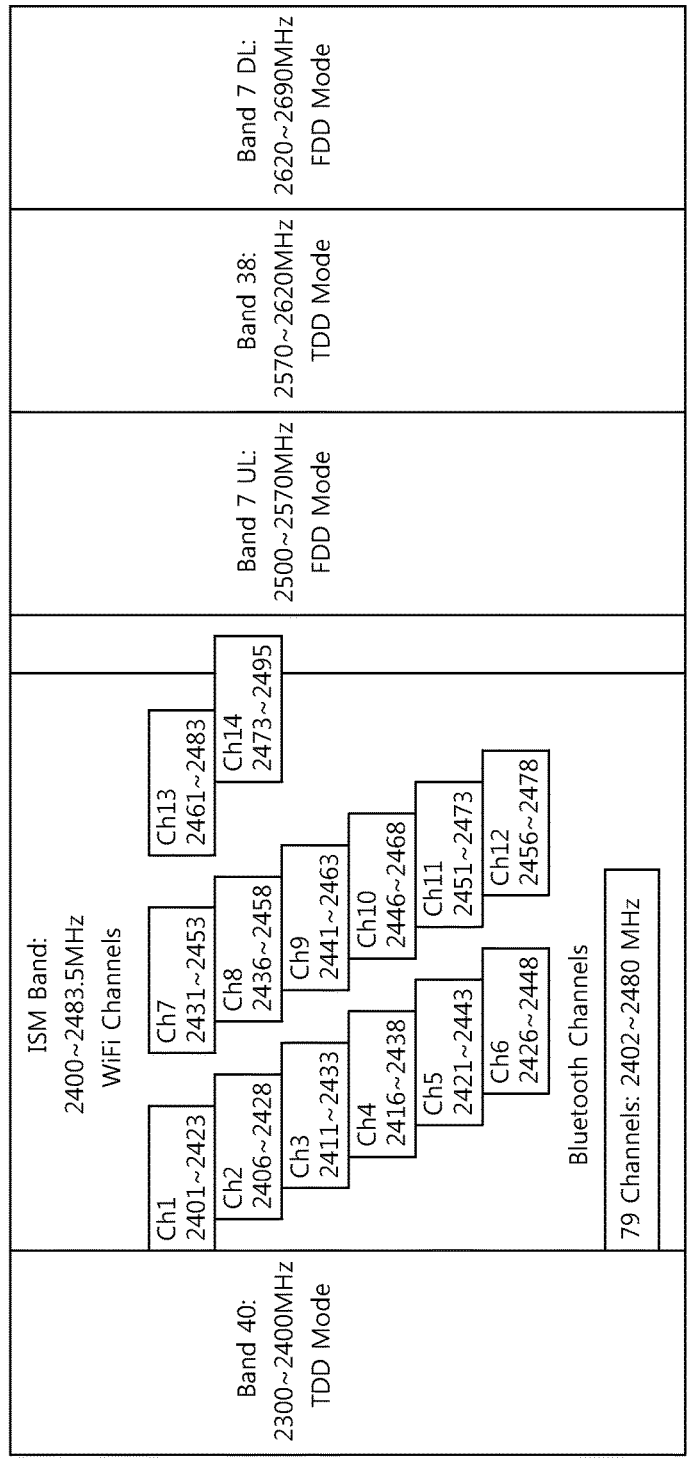
FIG. 8 shows 3GPP frequency bands around ISM band.

FIG. 8 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

When a UE experiences a level of IDC interference that cannot be solved by the UE itself and a network intervention is required, the UE sends an IDC indication via dedicated RRC signaling to report the problems. The details of the IDC indication trigger are left up to UE implementation: it may rely on existing LTE measurements and/or UE internal coordination. The IDC indication should be triggered based on ongoing IDC interference on the serving or non-serving frequencies, instead of assumptions or predictions of potential interference. A UE that supports IDC functionality indicates this capability to the network, and the network can then configure by dedicated signaling whether the UE is allowed to send an IDC indication. The UE may only send an IDC indication for E-UTRA UL/DL carriers for which a measurement object is configured.

Figure 9:
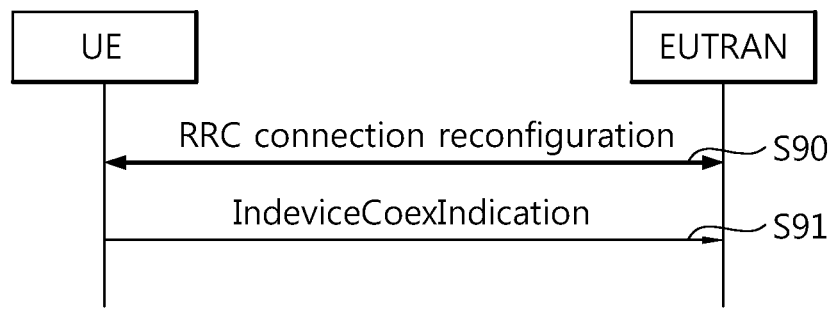
FIG. 9 shows an IDC indication procedure.

FIG. 9 shows an IDC indication procedure. The purpose of this procedure is to inform the E-UTRAN about (a change of) IDC problems experienced by the UE in RRC_CONNECTED and to provide the E-UTRAN with information in order to resolve them.

Referring to FIG. 9, at step S90, the UE and the E-UTRAN performs an RRC connection reconfiguration procedure. At step S91, the UE transmits an in-device coexistence indication (IndeviceCoexIndication) message to the E-UTRAN.

When the UE needs to receive a LTE common channel for a public warning system (PWS) message or an MBMS and transmit ISM radio, the eNB may not help the UE avoid IDC interference because the LTE common channel is scheduled for not only this UE but also other UEs. Thus, the UE may need to prioritize between reception of LTE common channel and transmission of the ISM radio. If the UE considers that reception of the LTE common channel is more important than transmission of the ISM radio, the UE would apply internal solution to avoid the IDC interference, e.g. denial of ISM transmission. If the UE considers that transmission of the ISM radio is more important, the UE may skip reception of some of the LTE common channels.

Accordingly, when the IDC interference is detected, a method for transmitting an indication for prioritizing one of either reception of the LTE common channel or transmission of the ISM radio may be proposed according to embodiments of the present invention.

At first, a method for transmitting an indication for prioritizing one of reception of an MBMS or transmission of an ISM radio according to an embodiment of the present invention is described.

If the UE supports MBMS, the UE should acquire MBMS control information on an MCCH and may also receive the MBMS on an MTCH. It is a question how the UE avoids IDC interference problem when the UE is receiving the MBMS on a frequency under the IDC interference. If the UE considers that interested MBMS is important, the UE may be able to restrict ISM transmissions. Otherwise, the UE may skip reception of the MBMS for a while. Prioritization between MBMS reception and ISM transmission may be up to UE implementation Meanwhile, interaction between an IDC indication and an MBMS interest indication may be a problem. An unusable frequency in the IDC indication is a frequency to which the UE should not move. But, an MBMS frequency in the MBMS interest indication is a frequency to which the UE should move. Thus, when the IDC indication and the MBMS interest indication indicate the same frequency, it is a question how eNB interpret UE's intention from both the IDC indication and the MBMS interest indication.

In this case, the eNB may consider both the IDC indication and the MBMS interest indication. Accordingly, if the eNB receives the IDC indication and the MBMS interest indication for the same frequency (i.e. unusable MBMS frequency), the eNB may consider both indications, and so the eNB would move the UE to the unusable MBMS frequency with TDM solution. In this way, if the UE detects the IDC interference on the MBMS frequency that the UE has previously transmitted in the MBMS interest indication, and if the UE does not want to receive the MBMS due to the IDC interference, the UE should indicate updated MBMS interest indication excluding the unusable MBMS frequency. Then, since the UE updated MBMS interest, the eNB won't move the UE to the unusable MBMS frequency. On the other hand, if the UE does not transmit the updated MBMS interest indication, the eNB may consider both the IDC indication and the MBMS interest indication, and so the eNB will move the UE to the unusable MBMS frequency with TDM solution.

Or, the UE, receiving an MTCH and an MCCH, may indicate reception of the MBMS in the IDC indication when transmitting the IDC indication including TDM assistance information such as subframes under the IDC interference. Upon receiving the IDC indication, the eNB may avoid scheduling the MBMS on the subframes under the IDC interference.

Secondly, a method for transmitting an indication for reception of a PWS message over transmission of an ISM radio according to an embodiment of the present invention is described.

If the UE supports the PWS message, the UE should acquire the PWS message via system information. Since the PWS message is used for public safety, the PWS message should be considered as critical information. Thus, it is likely that if the UE supports the PWS message, the UE may prioritize reception of the PWS message over the ISM transmission, by restricting the ISM transmission.

Broadcast of the PWS message would occur only for emergency situations. Thus, restriction of the ISM transmissions due to the PWS message may seldom occur. However, when emergency situation occurs, it is assumed that the PWS message would be frequently broadcast and updated in a certain period. In this case, the UE may need to restrict the ISM transmissions many times in the period, which may be not so acceptable in ISM side.

To solve the problem above, the network may move UEs receiving the PWS message to the frequency free from the IDC interference. Although the network does not know whether or not the UE is receiving the PWS message, the network may assume that most of UEs would support the PWS message in a specific region. For example, most of UEs in Japan may support an earthquake and tsunami warning system (EWTS) and most of UEs in USA may support a commercial mobile alert system (CMAS). Thus, while the eNB is broadcasting the PWS message, if the eNB receives the IDC indication from the UE, the eNB may apply FDM solution to the UE, rather than TDM solution.

Or, the UE, receiving the PWS message, may indicate reception of the PWS message in the IDC indication when transmitting the IDC indication including TDM assistance information such as subframes under the IDC interference. Upon receiving the IDC indication, the eNB may avoid scheduling the PWS message on the subframes under the IDC interference.

Figure 10:
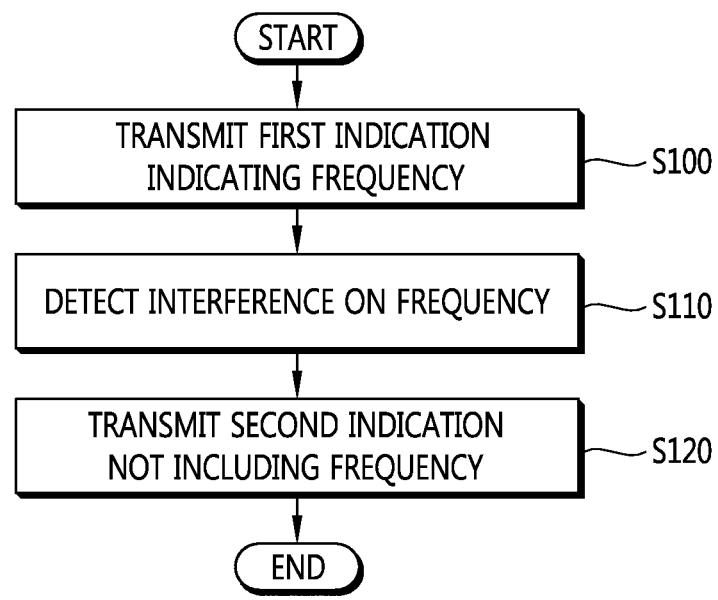
FIG. 10 shows an example of a method for transmitting an indication according to an embodiment of the present invention.

FIG. 10 shows an example of a method for transmitting an indication according to an embodiment of the present invention.

At step S100, a UE transmits a first indication indicating a frequency to an eNB. The first indication may be an MBMS interest indication. The frequency may be an LTE frequency where interested MBMS service is provided.

At step S110, the UE detects interference on the frequency. The interference may be IDC interference. The IDC interference may be from ISM radio such as Wi-Fi or Bluetooth.

At step S120, the UE transmits a second indication not including the frequency to the eNB. The second indication may be an MBMS interest indication. The second indication may be transmitted if the interference needs to be avoided, i.e. the interference is not acceptable. Or, the UE may not transmit the second indication excluding the frequency if the interference is acceptable.

The UE may further transmit an interference indication indicating that the frequency is unusable due to the interference. The interference indication may be an IDC indication.

Figure 11:
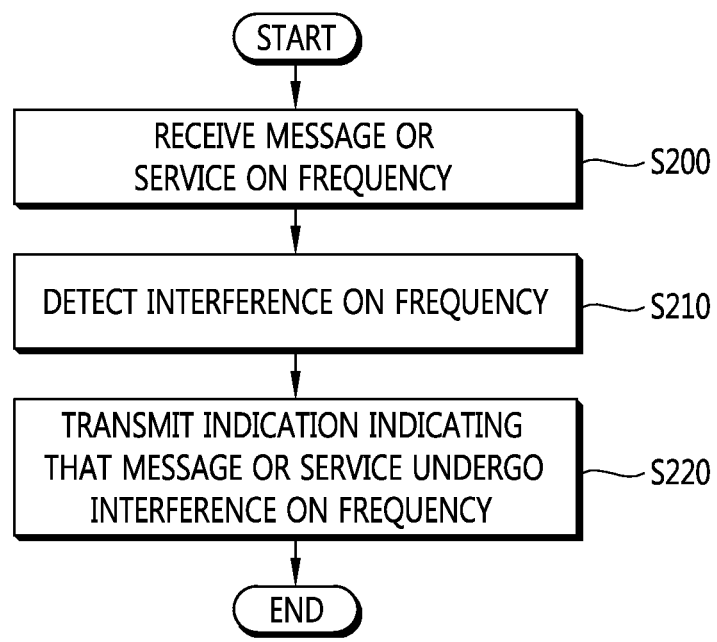
FIG. 11 shows another example of a method for transmitting an indication according to an embodiment of the present invention.

FIG. 11 shows another example of a method for transmitting an indication according to an embodiment of the present invention.

At step S200, a UE receives a message or a service on a frequency. The message may be a PWS message. The service may be an MBMS.

At step S210, the UE detects interference on the frequency. The interference may be IDC interference.

At step S220, the UE transmits an indication indicating that the message or the service undergo the interference on the frequency. That is, the indication may include the frequency where the message or the service is received and information on reception of the message or the service. The indication may be an IDC indication, and the IDC indication may include TDM assistance information.

Figure 12:
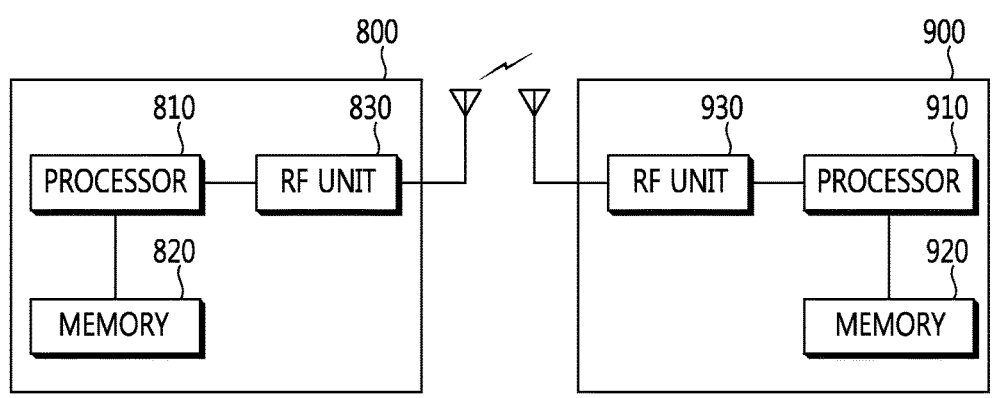
FIG. 12 is a block diagram showing wireless communication system to implement an embodiment of the present invention.

FIG. 12 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), an indication in a wireless communication, the method comprising:
    transmitting a first multimedia broadcast/multicast service (MBMS) interest indication including information on a frequency;
    detecting that an internal interference on the frequency is caused by Wi-Fi service of the UE;
    determining which one of a MBMS service and the Wi-Fi service is to be prioritized, in response to the detecting;
    excluding the information on the frequency from the first MBMS interest indication thereby generating a second MBMS interest indication without the information on the frequency, in response to the determining that the Wi-Fi service is to be prioritized since the MBMS service is not required anymore; and
    transmitting the second MBMS interest indication without the information on the frequency.

2. The method of claim 1, wherein the frequency is a long-term evolution (LTE) frequency.

3. The method of claim 1, wherein the frequency is used to receive the MBMS service.

4. The method of claim 1, wherein the internal interference is in-device coexistence (IDC) interference.

5. The method of claim 1, further comprising transmitting an interference indication indicating that the frequency is unusable due to the internal interference.

6. The method of claim 5, wherein the internal interference indication is an IDC indication.

* * * * *